Sept. 14, 1943.  R. H. NOBLE ET AL  2,329,214
CUTTING MACHINE
Filed July 8, 1942
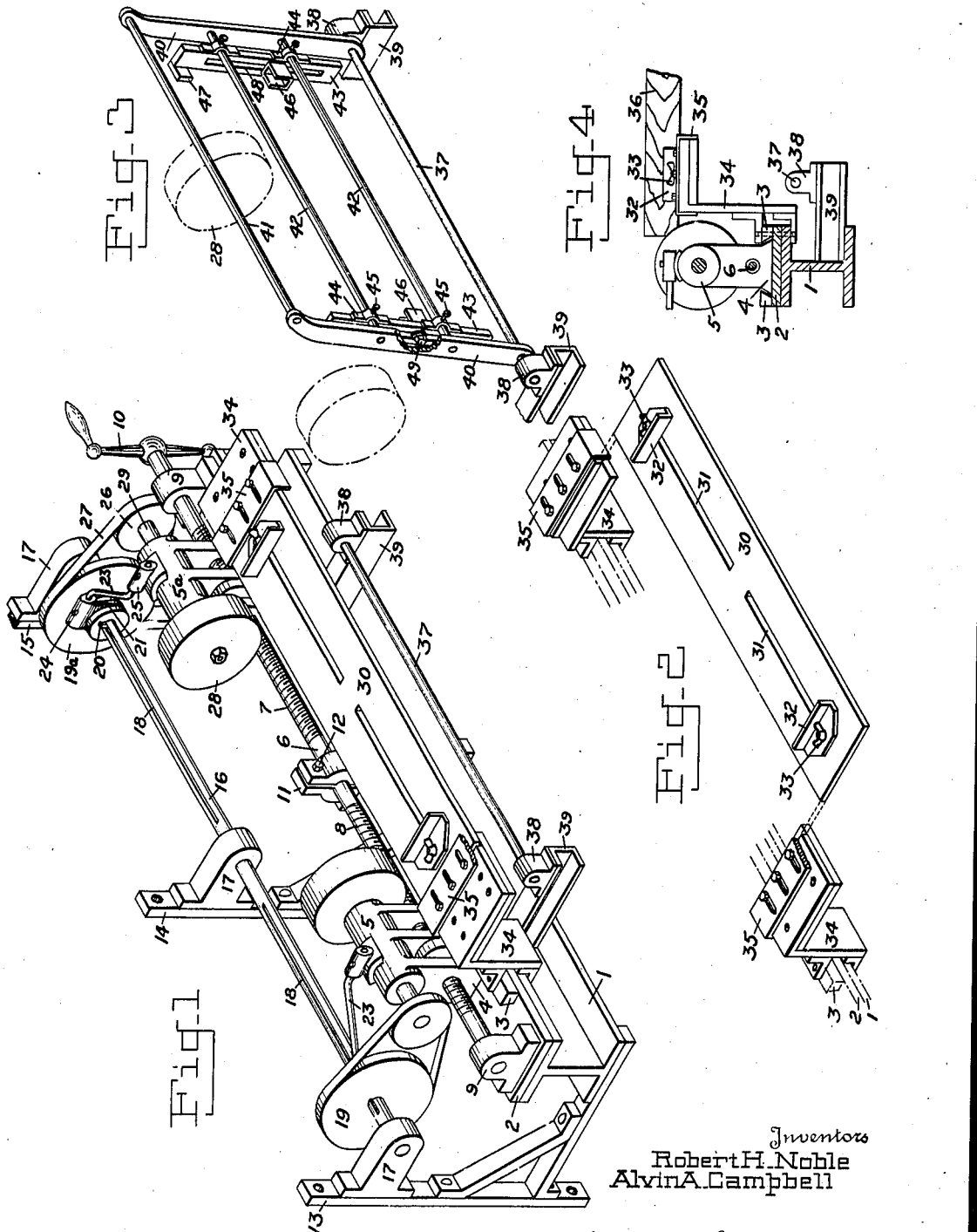
Inventors
Robert H. Noble
Alvin A. Campbell
By G. J. Kessenich & J. H. Church
Attorneys Patented Sept. 14, 1943

2,329,214

UNITED STATES PATENT OFFICE 2,329,214

CUTTING MACHINE

Robert H. Noble, Wharton, and Alvin A. Campbell, Hackettstown, N. J.

Application July 8, 1942, Serial No. 450,180

8 Claims. (Cl. 144—136)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a machine for cutting a plurality of slots or grooves in sheet material such as wood planks and the like.

An object of this invention is to provide a machine having spaced rotating cutters which are adjustable for cutting spaced slots in planks. Another object of this invention is to provide a machine for cutting grooves on the faces of planks for ammunition packing boxes and like containers. Another object of this invention is to provide a machine for cutting hinge clearance slots at approximately 45° on the edges of planks for such containers. Still other objects and advantages of the invention will appear hereinafter in the following detailed description of a preferred embodiment as shown in the accompanying drawing in which:

Fig. 1 is an isometric view of the apparatus,

Fig. 2 is an exploded isometric view of a work-supporting table for cutting hinge clearance slots, Fig. 3 is an isometric view of a work-holding cradle for cutting circular grooves on the face of a plank, the cutting tools being indicated in broken lines, and Fig. 4 is a partial vertical section of the apparatus taken immediately to the left of the end of rail 3 in Fig. 1.

The machine according to the invention includes a pair of spaced slot-cutting tools, means for driving said tools, means for adjusting the spacing of said tools, and means for supporting work to be grooved for movement against said tools.

Referring now to the drawing, a bed 1, in the form of an I-beam, is the main supporting member of the machine. On top of the bed there is welded a surface plate 2. Rails 3 are welded to the edges of the plate providing a channel in which the bases 4 of the cutting tool head stocks 5 and 5a are positioned for sliding movement longitudinally of the bed. A screw 6 having right-handed threads 7 and left-handed threads 8 is fitted to mating threads in the uprights of the cutting tool head stocks and is journalled in bearings 9 welded to the ends of surface plate 2. The right-hand end of the screw is provided with a crank 10. This arrangement provides for longitudinal adjustment of the two cutter heads. Turning the screw in one direction causes both cutting tool heads simultaneously to approach the center of the machine due to the opposing pitches of threads 7 and 8. Turning the screw in the other direction causes reverse movement of the heads. A split collar 11 provided with a clamping screw 12 surrounds the center of the screw 6 and is welded to the surface plate 2. When the cutter heads have been set, they are fixed in place by clamping the split collar with the clamping screw thereby preventing rotation of the screw 6 and movement of the heads.

A framework 13, 14 and 15 is fixed to the underside of the bed 1 and carries a drive shaft 16 journalled in bearings 17. Means, not shown, is provided for driving the shaft; preferably such means is an electric motor geared or belt-connected to the shaft. The shaft is splined at 18 and mounts two pulleys 19 and 19a keyed to the shaft by keys 20 for rotation with the shaft. In addition, the pulleys may be slid along the shaft, keys 20 riding in splines 18. The pulleys are provided each with a floating collar 21 positioned in a groove in the hub of the pulley. This collar is linked to its respective cutting tool head by arm 23 secured to the collar in sleeve 24 and to the head in sleeve 25. Movement of the head to the right or left carries with it the driving pulley on the shaft so that at all times the driving pulley and the driven pulley are in operative alignment. The driving pulley 19a drives the driven pulley 26 through belt 27. The driven pulley, in turn, rotates the cutter 28 through shaft 29 journalled in the cutting tool head stock.

For the cutting of 45° hinge clearance slots in the edge of a plank, a work feed table 30 is provided (see Fig. 2 for exploded view). Slots 31 are formed in the table and guides 32, mounted for lateral adjustment, are provided with bolts passing through slots 31 and wing-nuts 33 for securing the guides to the table. The table is mounted in brackets 34 bolted to the bed 1, as shown, the brackets being provided with sliding keepers 35 which engage the ends of the table to hold it to the brackets. The table is removable from the brackets to permit the alternative use of the work-holding cradle shown in Fig. 3 as will be explained hereinafter.

In operation, for cutting hinge clearance slots, the table 30 is fitted to the brackets 34, and the guides 32 are adjusted to the width of the board to be slotted. The cutting wheels are set the required distance apart by screw 6 which is then clamped in place. The cutters are set in motion by applying power to the drive shaft 16. A board 36 to be slotted is rested on the table and fed by hand against the cutters as shown in Fig. 4. A segmental slot is formed in the edge of the board by each of the cutters. The inclination of this slot may be varied by providing a higher or lower table, by varying the diameter of the cutter wheel, or by varying the depth of the cut as will be apparent to one skilled in the art.

For the cutting of a pair of spaced circular slots in a plank the cradle shown in Fig. 3 is used. The cradle is mounted on a rod 37 carried in bearings 38 on arms 39 welded to the bed 1, and swings about the rod 37. The cradle is provided with side members 40, a top transverse bar 41, and two transverse slider bars 42. Two sliders 43 are attached to the bars 42 by bearing caps 44 which are clamped by set screws 45 to fix the sliders in position. These sliders are adjusted to engage the ends of a board to be slotted, the lower corner of the board resting in adjustable cup 46 and the upper part of the board being engaged by lugs 47 on the slider. The cups 46 are vertically adjustable in slots 48 and are maintained in position by nuts 49 engaging screws passing through the slots and attached to the cups. This adjustment permits various sized boards to be slotted on the machine.

In operation, for the cutting of spaced circular slots in a board, the table 30 is removed from the machine. The cradle, mounted on its axle, is thus free to be rotated between the table brackets and moved adjacent the cutting wheels. A board is positioned in the cradle sliders and the cradle is then rotated to force the board in contact with the cutting wheels, which have previously been spaced the required distance apart. Pressure is maintained to press the board against the cutting wheels until the slots have been cut to the desired depth.

We claim:

1. A machine for cutting grooves in planks and the like which comprises an elongated bed, a pair of head stocks slidably mounted on said bed for movement longitudinally of said bed, a cutting tool carried by each of said stocks, a longitudinal screw rotatably mounted on said bed and having right handed threads engaging a complementary screw element of one of said stocks and having left handed threads engaging a complementary screw element of the other of said stocks, means for rotating said screw, a drive shaft having a driving element for each of said cutting tools slidable on said shaft, a driven element carried by each of said stocks actuating a cutting tool, means linking each of said driving elements to its associated head stock for longitudinal movement therewith to maintain driving alignment between respective driving and driven elements, and means for supporting work to be grooved for movement against said tools.

2. A machine for cutting grooves in planks and the like which comprises an elongated bed, a pair of head stocks slidably mounted on said bed for movement longitudinally of said bed, a cutting tool carried by each of said stocks, a longitudinal screw rotatably mounted on said bed and having right handed threads engaging a complementary screw element of one of said stocks and having left handed threads engaging a complementary screw element of the other of said stocks, means for rotating said screw, means for selectively preventing rotation of said screw, a drive shaft having a driving element for each of said cutting tools slidable on said shaft, a driven element carried by each of said stocks actuating a cutting tool, means linking each of said driving elements to its associated head stock for longitudinal movement therewith to maintain driving alignment between respective driving and driven elements, and means for supporting work to be grooved for movement against said tools.

3. A machine for cutting grooves in planks and the like which comprises an elongated bed, a pair of head stocks slidably mounted on said bed for movement longitudinally of said bed, a cutting tool carried by each of said stocks, a longitudinal screw rotatably mounted on said bed and having right handed threads engaging a complementary screw element of one of said stocks and having left handed threads engaging a complementary screw element of the other of said stocks, means for rotating said screw, a drive shaft having a driving element for each of said cutting tools slidable on said shaft, a driven element carried by each of said stocks actuating a cutting tool, means linking each of said driving elements to its associated head stock for longitudinal movement therewith to maintain driving alignment between respective driving and driven elements, and a table for supporting work to be grooved for movement against said tools.

4. A machine for cutting grooves in planks and the like which comprises an elongated bed, a pair of head stocks slidably mounted on said bed for movement longitudinally of said bed, a cutting tool carried by each of said stocks, a longitudinal screw rotatably mounted on said bed and having right handed threads engaging a complementary screw element of one of said stocks and having left handed threads engaging a complementary screw element of the other of said stocks, means for rotating said screw, a drive shaft having a driving element for each of said cutting tools slidable on said shaft, a driven element carried by each of said stocks actuating a cutting tool, means linking each of said driving elements to its associated head stock for longitudinal movement therewith to maintain driving alignment between respective driving and driven elements, and a pivoted cradle for supporting work to be grooved for movement against said tools.

5. A machine for cutting grooves in planks and the like comprising an elongated bed, a pair of head stocks slidably mounted on said bed for movement longitudinally of said bed, a cutting wheel carried by each of said stocks, a driven pulley connected to each of said cutting wheels, a longitudinal screw rotatably mounted on said bed and having right-handed threads engaging a complementary screw element of one of said stocks and having left-handed threads engaging a complementary screw element of the other of said stocks, means for rotating said screw, a splined drive shaft, a pair of driving pulleys slidably mounted on said shaft and keyed to said spline, a collar carried by each of said driving pulleys, a rigid arm linking each of said collars to a corresponding head stock, and means for supporting work to be grooved for movement against said tools.

6. A machine for cutting grooves in planks and the like comprising an elongated bed, a pair of head stocks slidably mounted on said bed for movement longitudinally of said bed, a cutting wheel carried by each of said stocks, a driven pulley connected to each of said cutting wheels, a longitudinal screw rotatably mounted on said bed and having right-handed threads engaging a complementary screw element of one of said stocks and having left-handed threads engaging a complementary screw element of the other of said stocks, means for rotating said screw, adjustable clamping means for preventing rotation of said screw, a splined drive shaft, a pair of driving pulleys slidably mounted on said shaft and keyed to said spline, a collar carried by each of said driving pulleys, a rigid arm linking each of said collars to a corresponding head stock, and means for supporting work to be grooved for movement against said tools.

7. A machine for cutting grooves in planks and the like comprising an elongated bed, a pair of head stocks slidably mounted on said bed for movement longitudinally of said bed, a cutting wheel carried by each of said stocks, a driven pulley connected to each of said cutting wheels, a longitudinal screw rotatably mounted on said bed and having right-handed threads engaging a complementary screw element of one of said stocks and having left-handed threads engaging a complementary screw element of the other of said stocks, means for rotating said screw, a splined drive shaft, a pair of driving pulleys slidably mounted on said shaft and keyed to said spline, a collar carried by each of said driving pulleys, a rigid arm linking each of said collars to a corresponding head stock, and a table for supporting work to be grooved for movement against said tools.

8. A machine for cutting grooves in planks and the like comprising an elongated bed, a pair of head stocks slidably mounted on said bed for movement longitudinally of said bed, a cutting wheel carried by each of said stocks, a driven pulley connected to each of said cutting wheels, a longitudinal screw rotatably mounted on said bed and having right-handed threads engaging a complementary screw element of one of said stocks and having left-handed threads engaging a complementary screw element of the other of said stocks, means for rotating said screw, a splined drive shaft, a pair of driving pulleys slidably mounted on said shaft and keyed to said spline, a collar carried by each of said driving pulleys, a rigid arm linking each of said collars to a corresponding head stock, and a pivoted cradle for supporting work to be grooved for movement against said tools.

ROBERT H. NOBLE.
ALVIN A. CAMPBELL.